(12) United States Patent
Piazza et al.

(10) Patent No.: US 9,875,135 B2
(45) Date of Patent: *Jan. 23, 2018

(54) UTILITY-OPTIMIZED SCHEDULING OF TIME-SENSITIVE TASKS IN A RESOURCE-CONSTRAINED ENVIRONMENT

(71) Applicant: BMC Software, Inc., Houston, TX (US)

(72) Inventors: Jeffrey E. Piazza, Wellesley, MA (US); Michael Theroux, Milford, NH (US); David A. Solin, Austin, TX (US)

(73) Assignee: BMC Software, Inc., Houston, TX (US)

( * ) Notice: Subject to any disclaimer, the term of this patent is extended or adjusted under 35 U.S.C. 154(b) by 621 days.

This patent is subject to a terminal disclaimer.

(21) Appl. No.: 14/513,676

(22) Filed: Oct. 14, 2014

(65) Prior Publication Data

US 2015/0033237 A1    Jan. 29, 2015

Related U.S. Application Data

(63) Continuation of application No. 12/789,663, filed on May 28, 2010, now Pat. No. 8,875,143.

(Continued)

(51) Int. Cl.
*G06F 9/46*     (2006.01)
*G06Q 10/00*    (2012.01)
*G06F 9/48*     (2006.01)

(52) U.S. Cl.
CPC ............ *G06F 9/46* (2013.01); *G06F 9/4881* (2013.01); *G06F 2209/485* (2013.01)

(58) Field of Classification Search
CPC .............. G06F 9/00–9/54; G06Q 10/00–50/00

(Continued)

(56) References Cited

U.S. PATENT DOCUMENTS 5,995,997 A    11/1999  Horvitz
6,263,358 B1    7/2001  Lee et al.

(Continued)

OTHER PUBLICATIONS

Buyya, Rajkumar, and Manzur Murshed. "Gridsim: A toolkit for the modeling and simulation of distributed resource management and scheduling for grid computing." Concurrency and computation: practice and experience 14.13-15 (2002): 1175-1220.*

(Continued)

*Primary Examiner* — Alan S Miller
(74) *Attorney, Agent, or Firm* — Brake Hughes Bellermann LLP

(57) ABSTRACT

Systems and methods implementing utility-maximized scheduling of time-sensitive tasks in a resource constrained-environment are described herein. Some embodiments include a method for utility-optimized scheduling of computer system tasks performed by a processor of a first computer system that includes determining a time window including a candidate schedule of a new task to be executed on a second computer system, identifying other tasks scheduled to be executed on the second computer system within said time window, and identifying candidate schedules that each specifies the execution times for at least one of the tasks (which include the new task and the other tasks). The method further includes calculating an overall utility for each candidate schedule based upon a task utility calculated for each of the tasks when scheduled according to each corresponding candidate schedule and queuing the new task for execution according to a preferred schedule with the highest overall utility.

28 Claims, 6 Drawing Sheets

Related U.S. Application Data

(60) Provisional application No. 61/291,412, filed on Dec. 31, 2009.

(58) Field of Classification Search
USPC .................. 718/100–108; 705/7.11–7.42
See application file for complete search history.

(56) References Cited

U.S. PATENT DOCUMENTS

| | | | |
|---|---|---|---|
| 6,578,005 B1* | 6/2003 | Lesaint | G06Q 10/06 705/7.14 |
| 6,735,596 B2 | 5/2004 | Corynen | |
| 7,316,020 B2 | 1/2008 | Raja et al. | |
| 7,386,586 B1 | 6/2008 | Headley et al. | |
| 7,707,288 B2* | 4/2010 | Dawson | G06F 9/505 709/224 |
| 8,122,281 B2 | 2/2012 | Bansal et al. | |
| 8,266,622 B2 | 9/2012 | Cardelli | |
| 2003/0208470 A1 | 11/2003 | MacLellan et al. | |
| 2006/0122927 A1* | 6/2006 | Huberman | G06F 9/5005 705/37 |
| 2006/0149842 A1* | 7/2006 | Dawson | G06F 9/505 709/226 |
| 2006/0218551 A1 | 9/2006 | Berstis et al. | |
| 2006/0242648 A1 | 10/2006 | Guccione et al. | |
| 2007/0006235 A1 | 1/2007 | Chang et al. | |
| 2007/0016907 A1 | 1/2007 | Benedetti et al. | |
| 2007/0143760 A1 | 6/2007 | Chan et al. | |
| 2007/0220517 A1 | 9/2007 | Lippett | |
| 2007/0271570 A1 | 11/2007 | Brown et al. | |
| 2008/0040630 A1* | 2/2008 | Travostino | H04L 12/5695 714/11 |
| 2008/0091289 A1 | 4/2008 | Gozzi et al. | |
| 2008/0189709 A1 | 8/2008 | Amin | |
| 2008/0320482 A1* | 12/2008 | Dawson | G06F 9/5027 718/104 |
| 2009/0070762 A1* | 3/2009 | Franaszek | G06F 9/4881 718/102 |
| 2009/0241117 A1 | 9/2009 | Dasgupta et al. | |
| 2010/0095299 A1 | 4/2010 | Gupta et al. | |
| 2010/0153960 A1* | 6/2010 | Youn | G06F 9/5061 718/104 |
| 2010/0325637 A1 | 12/2010 | Radmilac et al. | |
| 2011/0138391 A1* | 6/2011 | Cho | G06F 9/4881 718/102 |
| 2011/0161964 A1 | 6/2011 | Piazza et al. | |

OTHER PUBLICATIONS

Cao, Qi, Zhi-Bo Wei, and Wen-Mao Gong. "An optimized algorithm for task scheduling based on activity based costing in cloud computing." Bioinformatics and Biomedical Engineering, 2009. ICBBE 2009. 3rd International Conference on. IEEE, 2009.*

Buyya, Rajkumar, et al. "Economic models for resource management and scheduling in grid computing." Concurrency and computation: practice and experience 14.13-15 (2002): 1507-1542.*

Hartmann, Sönke. "A competitive genetic algorithm for resource-constrained project scheduling." Naval Research Logistics (NRL) 45.7 (1998): 733-750.*

Yu, Jia, Rajkumar Buyya, and Kotagiri Ramamohanarao. "Workflow scheduling algorithms for grid computing." Metaheuristics for scheduling in distributed computing environments (2008): 173-214.*

Non-Final Office Action received for U.S. Appl. No. 12/789,663, dated Sep. 11, 2012, 12 pages.

Non-Final Office Action Response filed for U.S. Appl. No. 12/789,663, filed Dec. 5, 2012, 13 pages.

Final Office Action received for U.S. Appl. No. 12/789,663, dated Mar. 18, 2013, 15 pages.

Final Office Action Response filed for U.S. Appl. No. 12/789,663, filed Apr. 12, 2013, 14 pages.

Advisory Action received for U.S. Appl. No. 12/789,663, dated May 1, 2013, 3 pages.

Non-Final Office Action received for U.S. Appl. No. 12/789,663, dated Jan. 16, 2014, 14 pages.

Non-Final Office Action Response filed for U.S. Appl. No. 12/789,663, filed Apr. 11, 2014, 6 pages.

Notice of Allowance Received for U.S. Appl. No. 12/789,663, dated Jun. 23, 2014, 14 pages.

Berman et al., "Scheduling from the Perspective of the Application", Proceedings of 5th IEEE International Symposium on High Performance Distributed Computing, Aug. 1996, 12 pages.

Cendron et al., "A Price-Based Task Scheduling for Grid Computing", IEEE, Seventh International Conference on Networking, Apr. 13-18, 2008, pp. 762-766.

Rhett, "Amazon Elastic Compute Cloud: An Introduction to Spot Instances", Dec. 13, 2009, pp. 1-21.

Yuan et al., "A Resource Price-adjusting Mechanism for Supply and Demand Balance in Grid Computing", IEEE, Sixth International Conference on Parallel and Distributed Computing, Applications and Technologies, Dec. 5-8, 2005, pp. 97-99.

* cited by examiner

UTILITY-OPTIMIZED SCHEDULING OF TIME-SENSITIVE TASKS IN A RESOURCE-CONSTRAINED ENVIRONMENT

CROSS-REFERENCE TO RELATED APPLICATION

This application is a continuation of, and claims priority to, U.S. patent application Ser. No. 12/789,663, filed May 28, 2010, and entitled "Utility Optimized Scheduling of Time-Sensitive Tasks in a Resource-Constrained Environment", which claims priority to U.S. Provisional Patent Application No. 61/291,412, filed on Dec. 31, 2009, and entitled "System and Method for Utility-Maximized Scheduling of Time-Sensitive Work Items in a Resource-Constrained Environment", both of which are hereby incorporated by reference in their entirety.

BACKGROUND

"Cloud Computing" has become a very visible technology in recent years. Amazon, Google, and many others companies have established various types of clouds in order to provide users with a highly scalable computing infrastructure. These clouds, frequently implemented using very large collections of servers or "server farms," service a variety of needs ranging from large scale data storage to execution of virtual machines. One issue faced by providers of a public cloud infrastructure, or by any operator of a large, shared computer infrastructure, is how to efficiently utilize and distribute the workloads across the available system resources. Most computer systems will have peak load times, while at other times valuable resources may to unused. Examples of such resources include, but are no limited to:

CPU (e.g., FLOPS or MWIPS1, or as indicated in VMware tools, MHz)
Volatile Memory (e.g., RAM)
Storage (e.g., hard-disk space)
Network bandwidth
Power consumption
Database utilization Many large systems execute workload scheduler software to better utilize the available system resources. As computer systems have continued to provide increasingly larger processing capacities, however, the number of tasks scheduled for execution have also continued to increase. A large mainframe computer or server farm, for example, may have hundreds or even thousands of tasks scheduled for execution at any given point in time. With so many tasks to contend with and a finite set of resources, scheduling tasks such that all the operational constraints are met can be daunting. When such constraints cannot all be met, the workload scheduler software must choose which task requests to attempt to satisfy, deferring or even declining those task requests which cannot be met in the requested time frame. The ability of a workload scheduler to make appropriate choices among the many possible schedules depends upon the scheduler's access to relevant information about each task's scheduling requirements, including whether and how the task may be rescheduled. When resources become overcommitted, resource scheduling problems can be overshadowed by the related but different problem of optimally choosing, from among competing tasks, those task scheduling requests that will actually be fulfilled and those that will not.

Existing workload schedulers may thus not be able to adequately distribute the load at peak times of system resource utilization (wherein there may be conflicting user priorities) and troughs in utilization (wherein capacity may exceed demand). Further, existing methods of workload scheduling optimization tend to focus on the identification of processing bottlenecks and manual task ordering without taking into account which task schedules may provide greater overall value or utility. Thus, existing workload schedulers may also not adequately address situations where resources become overcommitted.

SUMMARY

The present disclosure describes systems and methods that utilize user-provided resource and scheduling task metadata to automatically optimize the schedule of tasks submitted to a computer system. The time variations in task utility operate in concert to create a utility-optimized schedule of the computer system's workload. The disclosed systems and methods determine an optimal scheduling of each task according to the aggregate utility that can be provided by available computing resources. Such scheduling thus results in the utility-optimized use of the computer system's resources.

In at least some embodiments, the scheduling of tasks is based upon an overall system utility measurement over a period of time, rather than at each fixed point in time, which is calculated based on the metadata of the tasks being scheduled. At least some of the metadata for each task within a selected time window is input into a user-selected utility function to determine a measure of the utility of the task as a function of time. The results of the utility functions for each task within the time window are combined to produce a measure of the overall utility of the tasks executing on a computer system for a given scheduling of the tasks over a given time period. Various analysis techniques may be applied to the results to identify a schedule that provides a maximized, optimal and/or preferred overall utilization of the computer system's resources over time.

DETAILED DESCRIPTION

The present disclosure describes systems and methods that implement a utility-driven workload scheduling optimization of shared resources used to execute tasks submitted to a computer system. These methods further implement scheduling tasks designed to optimize a measured utility of these tasks within a resource-constrained environment. This optimization results in the utility-optimized use of the resources of the computer system. The scheduled tasks may include, for example, any of a variety of software programs that execute individually, separately and/or in conjunction with each other, and may be submitted as executable images, as command language scripts and/or as job control images that control the execution of one or more software programs.

In the interest of clarity, not all features of an actual implementation are described in the present disclosure. It will of course be appreciated that in the development of any such actual implementation (as in any development project), numerous decisions must be made to achieve the developers' specific goals (e.g., compliance with system- and business-related constraints), and that these goals will vary from one implementation to another. It will further be appreciated that such development effort might be complex and time-consuming, but would nevertheless be a routine undertaking for those of ordinary skill in the art having the benefit of this disclosure. Moreover, the language used in the present disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure or characteristic described in connection with the embodiments is included in at least one embodiment of the invention, and multiple references to "one embodiment" or "an embodiment" should not be understood as necessarily all referring to the same embodiment.

Figure 1:
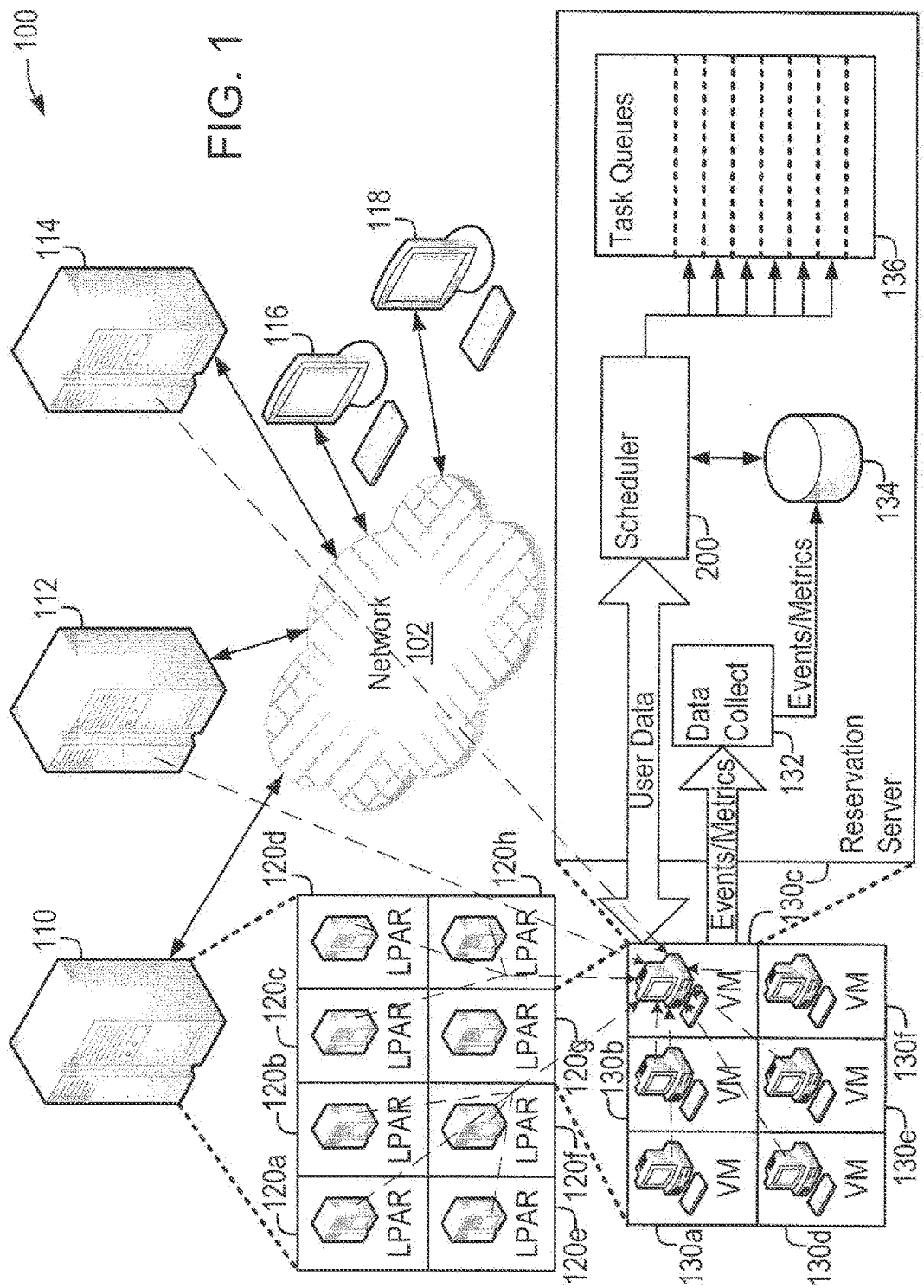
FIG. 1 illustrates an example system for performing utility-driven workload scheduling optimization.

FIG. 1 illustrates computer system 100, which performs the above-described scheduling and scheduling optimization in accordance with at least some embodiments. System 100 includes mainframe computer systems 110, 112 and 114, each of which represents a potential source of event messages and system metric data. System metrics may include, for example, available network bandwidth, processing throughput and utilization, available memory and storage space and number of available partitions and virtual machines. Event messages may include, for example, notifications triggered when one or more system metrics conform to an event criterion such as a system metrics value exceeding a threshold (e.g., available memory dropping below a pre-defined level) or when several system metrics indicate that several events have occurred within a window of time or in a specific sequence (e.g., multiple data access failures possibly indicating a failed or soon to fail disk drive). Those of ordinary skill in the art will recognize that the embodiments described herein can incorporate many other system metrics and events, and all such system metrics and events are contemplated by the present disclosure.

Mainframe 110 shows an example of how each mainframe of FIG. 1 may be subdivided into logical partitions (LPARs) 120a-120h. Each partition may subsequently operate as a host system for one or more guest virtual machines, such as virtual machines (VMs) 130a-130f hosted on logical partition 120g. All of the mainframes, logical partitions and virtual machines each represent a potential source of events and system metric data, which in the example embodiment shown are routed to a single reservation server. The flow of event messages and system metric data is represented by the dashed arrows originating from the various sources, which are all directed to a reservation server implemented using virtual machine 130c. Although a virtual machine is used to host the reservation server function in the example shown, any of a number of real or virtual host machines may be used, and all such host machines are contemplated by the present disclosure.

Continuing to refer to the example system of FIG. 1, events and sample metric data (Event/Metrics) are received by data collection module (Data Collect) 132, which is stored as resource utilization data on non-volatile storage device 134. Data collection module 132, as well as other modules described throughout the present disclosure, may be implemented within management station 130c in software, hardware or a combination of hardware and software. In at least some embodiments, the system metric data includes unsolicited periodic data samples transmitted by a system component, and may also/alternatively include data samples provided in response to periodic requests issued by data collection module 132. The system components may include any hardware and/or software component within the system of FIG. 1.

Scheduler module 200 interacts with users of the system via a user interface presented at a user workstation (e.g., a graphical user interface via user stations 116 and 118) to accept new task requests from the user. When submitting the task, users provide scheduler module 200 with a time-variant function expressing the utility of the task, which scheduler module 200 combines with the utility functions of previously scheduled jobs and with current resource utilization data stored on non-volatile storage device 134 to determine a schedule for running the user's task. Tasks may be scheduled by the system for immediate execution or for execution starting at a later time. After calculating the schedule, the user's task is automatically queued for execution according to the calculated schedule. In other embodiments, scheduler module 200 presents the schedule to the user (e.g., as a scheduler debugging tool or as an administrative function). The user may accept the task as scheduled, reject the schedule without submitting the task for execution, or change the utility function and submit the changes for a new schedule estimate. If the user accepts a task schedule, databases stored on non-volatile storage device 134 and used to track scheduled tasks are updated, and the user's task is submitted by scheduler module 200 for execution via one of job queues 136.

Figure 2:
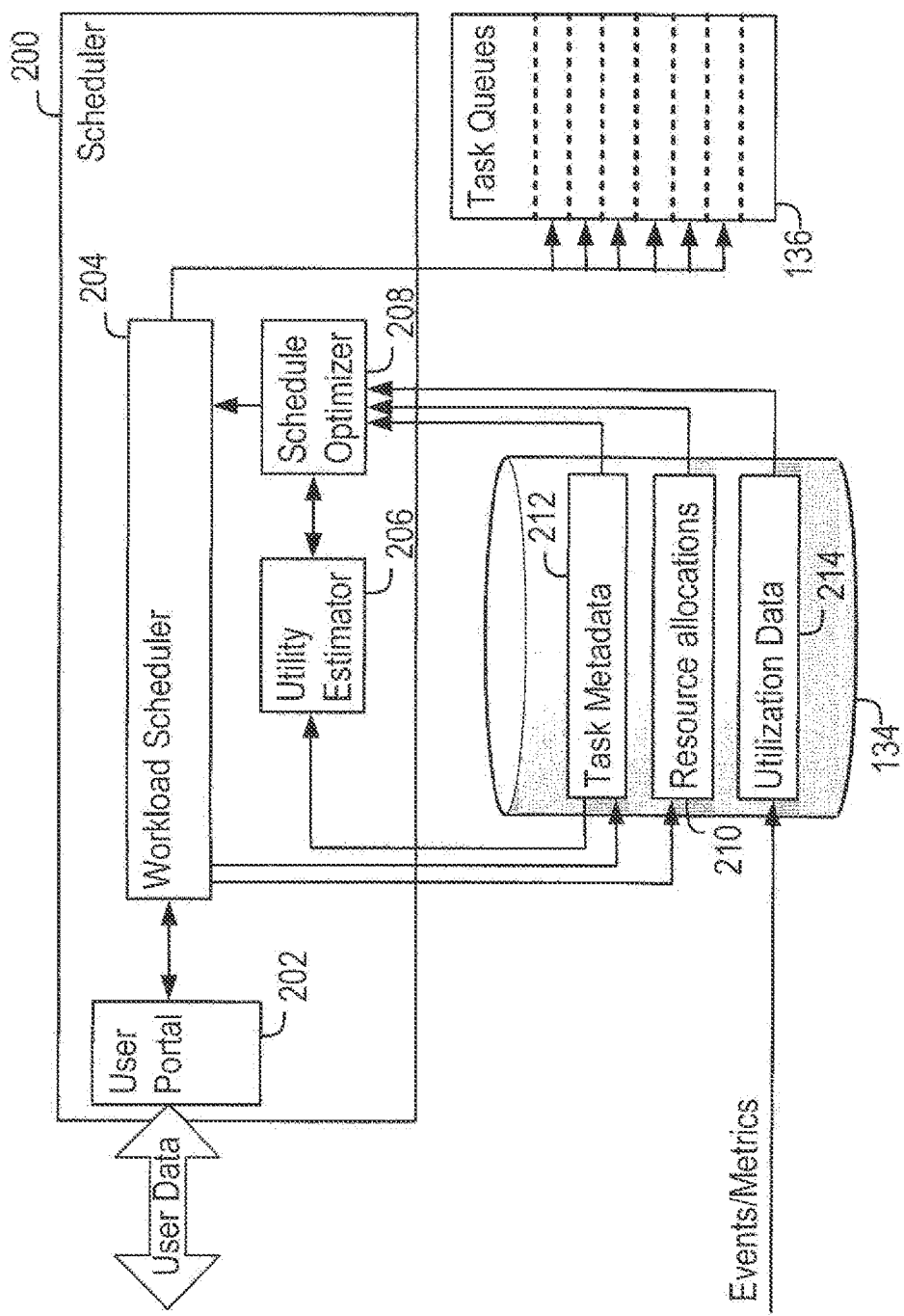
FIG. 2 illustrates a block diagram of the reservation system of FIG. 1.

FIG. 2 illustrates a more detailed block diagram of an embodiment of scheduler module 200 and the data stored on non-volatile storage device 134 and used by scheduler module 200. Scheduler module 200 includes user portal module 202, workload scheduler module 204, utility estimator module 206 and scheduler optimizer module 208. Referring now to both FIG. 2 and example method 300 of FIG. 3, a task request that includes information describing the resource and scheduling requirements of task to be submitted by a user (User Data) is received by user portal module 202 (block 302). The information within the request includes a user-selected utility function (explained in detail below) that describes the utility of the task as a function of time. This information is forwarded to workload scheduler module 204 and stored as task metadata 212. Task metadata 212 includes both a private and a public component. The private component includes the task-specific metadata provided by the user (i.e., task-specific scheduling and resource requirements), which is only exposed to scheduler module 200. The public component includes the aggregated data which is exposed as the projected overall system utilization over time, and/or overall system utility over time, presented to any user submitting a task request. The actual utility function for a specific task execution, however, remains private (i.e., only exposed to scheduler module 200).

User portal module 202 interacts with the user to provide data to, and receive data from, a user operating a user station (e.g., via a graphical user interface presented at user station 118 of FIG. 1). Schedule optimizer module 208 accesses resource allocation data 210, task metadata 212 and utilization data 214 to determine an optimal scheduling of all tasks. Event and metrics data collected by data collection module 132 of FIG. 1 are stored as utilization data 214. Resource allocations for tasks previously scheduled by workload scheduler module 204 are stored as resource allocations 210. After receiving the task request (block 302), schedule optimizer module 208 determines a time window within which the task may be scheduled (block 304). This window may range from just a few seconds to a year or more, depending upon the utility function specified by the user. Schedule optimizer module 208 subsequently identifies those other tasks that are already scheduled to execute within the time window (block 306).

After identifying the relevant tasks, schedule optimizer module 208 identifies a sample set of different schedules. This sample set may include all possible scheduling combinations of the relevant tasks or, if the number of combinations is too large, a subset of all possible combinations selected, e.g., at random. Such combinations may represent scheduling variations of only the submitted task, or alternatively may represent scheduling variations of both the submitted task and at least some of the tasks already scheduled. Once the sample set is identified, schedule optimizer module 208 selects one of the prospective samples within the sample set for processing (block 310). Schedule optimizer module 208 subsequently provides task and scheduling data to utility estimator module 206, which calculates the utility of each prospectively scheduled task using each task's user-selected utility function (block 312), stored as part of task metadata 212. The calculated utilities of the tasks are then aggregated to produce an overall system utility value over the time window for the selected schedule (block 314). Such an aggregation may include any of a number of calculations based upon the task utility values including, but not limited to, summation at a point in time, integration over a span of time and averaging of the values. Many other calculations suitable for aggregating the task utility values to produce a system utility value will become apparent to those of ordinary skill in the art, and all such calculations are contemplated by the present disclosure.

Figure 3:
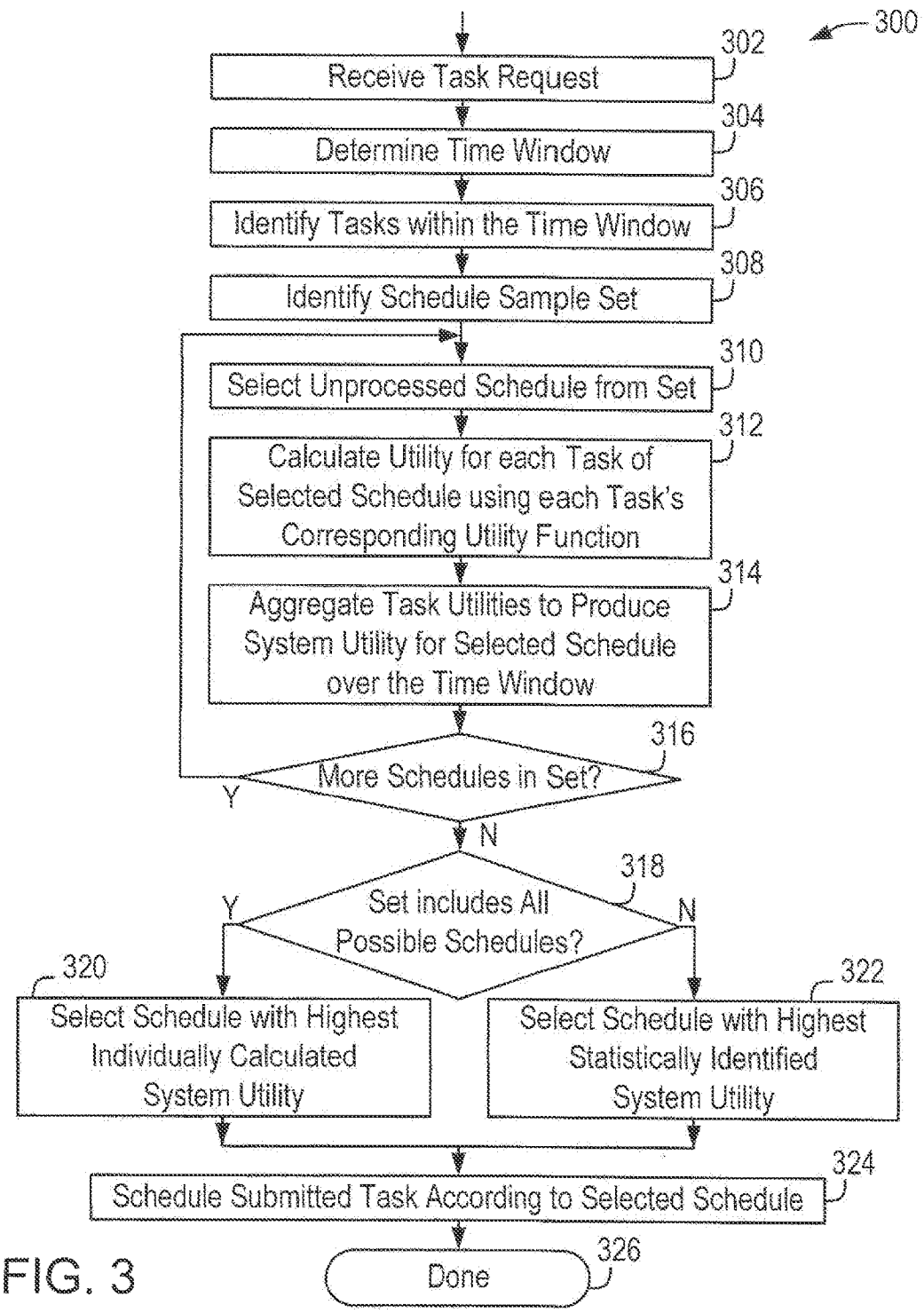
FIG. 3 illustrates an example method for implementing the utility-driven workload scheduling optimization performed by the system of FIG. 1.

Continuing to refer to FIGS. 2 and 3, if additional schedules within the sample set remain unprocessed (block 316) method steps 310-316 are repeated for each unprocessed schedule until an overall system utility value has been calculated for each prospective schedule (block 316). Once calculated, the overall system utility values may be used by schedule optimizer module 208 to determine the optimal time to execute the task submitted by the user. This optimal time is computed by solving for the maximum utility of all tasks that can be concurrently executed by the system over a given time window or time horizon (e.g., a year). If the sample set includes all possible combinations of schedules for the time window (block 318), the computation may be as simple as identifying the schedule with the highest individually calculated system utility value (block 320). If the sample set includes less than all possible scheduling combinations (e.g., because the total number of combinations is extremely large) the optimal time to execute the submitted tasks is determined by statistically analyzing the schedules within the sample set to identify the schedule with the highest system utility (block 322). Such statistical analysis may include additional iterations (not shown) wherein the sample set is modified between iterations based on the results of previous iterations in order to include samples that more accurately predict the optimal schedule.

Once a schedule is selected by schedule optimizer module 208, the submitted task automatically is scheduled to execute at the time or times required by the selected schedule (block 324) and presented at least one of tasks queues 136 by workload scheduler module 204, ending example method 300 (block 326). Any scheduling modifications of already scheduled tasks are also performed when the submitted task is scheduled (not shown). The resulting task schedule is thus based upon available resources, the utility function of the task and execution times required by the task. As already noted, in at least some embodiments scheduler module 200 may modify the schedule of any number of already scheduled tasks as new tasks are scheduled and submitted, as each task has an impact on the available resources of the system. Such an impact may further restrict an already scheduled task to an alternative execution time but still be desirable if the overall utility of the system is increased by the scheduling change. In at least some embodiments, losses in overall system utility value due to constrained resources are displayed, or retrieved via a query, on an administrative console.

As previously noted, for small numbers of tasks the above-described optimization may be achieved using exhaustive enumeration of all possible schedules. For larger numbers of tasks, where exhaustive enumeration may be impractical, more sophisticated statistical methods may be used (e.g., a Monte Carlo method such as simulated annealing). Other examples of methods suitable for determining an optimal task schedule may include any of a number of deterministic methods (e.g., interval optimization and branch and bound methods), stochastic methods (e.g., basin hopping, stochastic tunneling, parallel tempering and continuation methods) and metaheuristic methods (evolutionary algorithms, swarm-based optimizations, memetic algorithms, reactive search optimizations, differential evolution methods and graduated optimizations). Various other optimization methods may become apparent to those of ordinary skill in the art, and all such methods are contemplated by the present disclosure.

Figure 4:
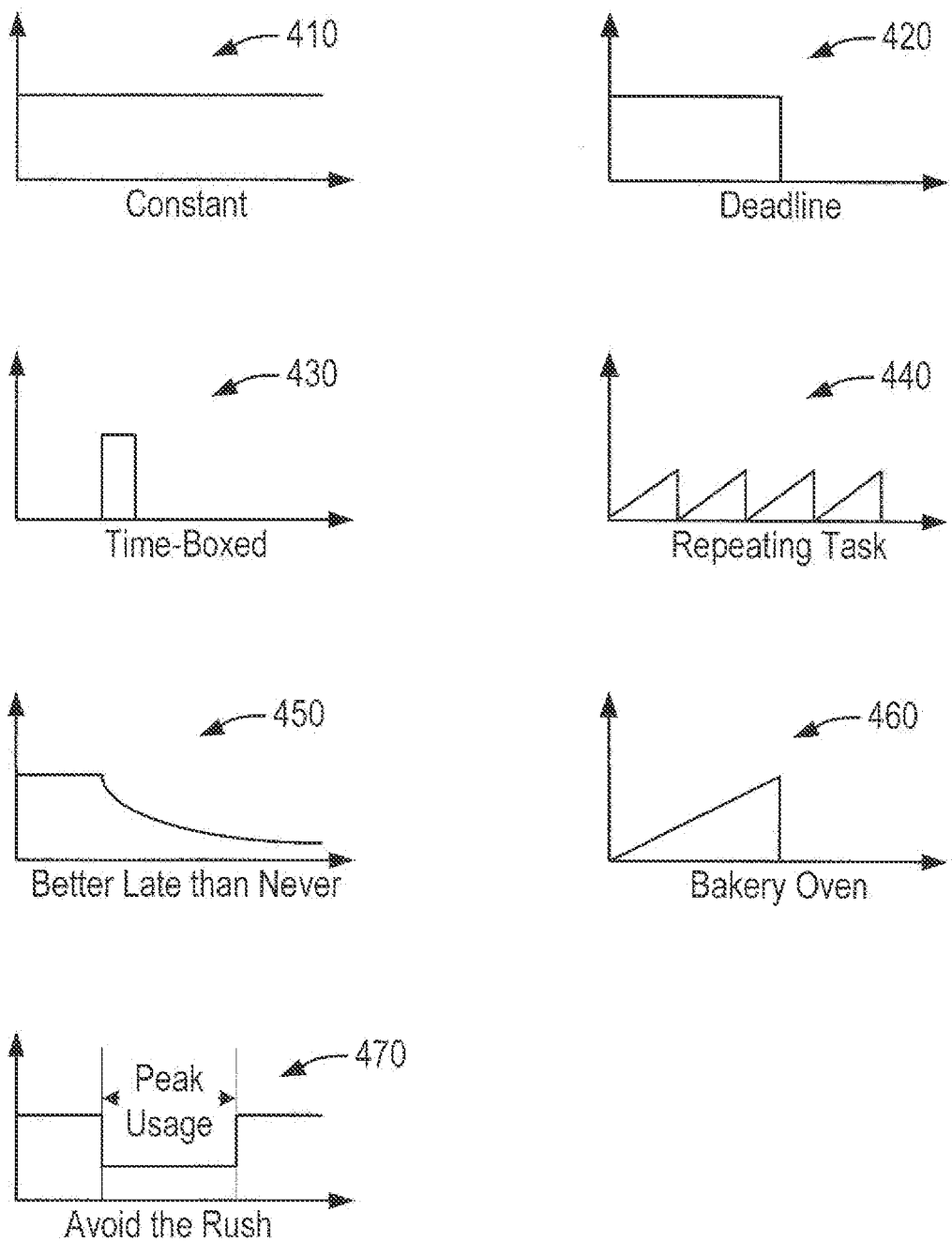
FIG. 4 illustrates the graphs of various utility functions that may be used by the reservation system of FIG. 2.

In at least some embodiments, the optimization performed by schedule optimizer module 208 is implemented based upon a user-provided utility function that describes the utility of each task as a function of its execution time. The utility function provides a measure of the usefulness of the task at a given point in time. Different utility functions may be used, and the utility of each function may be based on any of the utility functions made available to the user by user portal module 202. Examples of utility functions (shown graphically in FIG. 4) may include but are not limited to:

Anytime: constant utility across all possible execution times (graph 410);

Deadline: constant utility up to a deadline, zero utility after the deadline (graph 420);

Time-boxed: non-zero utility within a time window, zero utility outside the window; may be represented by a rectangular function (graph 430);

Repeating task: a series of individual tasks each with a deadline utility, wherein the utility value of a task occurrence may be increased after the failure of a preceding occurrence; may be represented by sinusoidal and sawtooth wave functions (graph 440);

Better late than never: constant utility up to a deadline, and decreased but non-zero utility after the deadline (graph 450);

Bakery oven: utility increases over time as a deadline approaches (reflecting "freshness" of the task's output), but goes to zero after the deadline (graph 460); and Avoid the rush: utility is higher if task execution does not overlap any of one or more sets of event boundaries (e.g., times of high system usage; graph 470).

In embodiments that implement one or more utility functions, scheduler module 200 of FIG. 2 operates by attempting to maximize the total utility score for the system at any given time using the limited resources available to it, wherein "total utility score" means the sum of the utility function values for each task as it executes over time. A simple scheduler module 200 may select only the most important tasks for immediate execution when resources become available, while a more sophisticated scheduler module 200 may attempt to formulate an optimal schedule across an arbitrary future time horizon using appropriate Monte Carlo methods such as simulated annealing. Regardless of the method by which the system attempts to optimize a task schedule, the choice between any two potential schedules can be made by comparing the integral values of each schedule's utility score over a particular time period. The schedule's utility score thus represents its overall utility over a period of time.

When no possible or considered schedule allows all tasks to be accomplished, it becomes necessary for scheduler module 200 to defer or decline tasks execution requests. In at least some embodiments, scheduler module 200 selects and schedules tasks that maximize the total utility delivered by the system's limited resources based upon the utility functions and scheduling requirements of each task. Scheduler module 200 may use the task utility functions in conjunction with system-wide policies to select which tasks to decline or defer. For example, rules may be in place that cause the scheduler module 200 to choose an execution schedule made up of a few high-utility tasks over a schedule comprised of many low-utility tasks.

Figure 5:
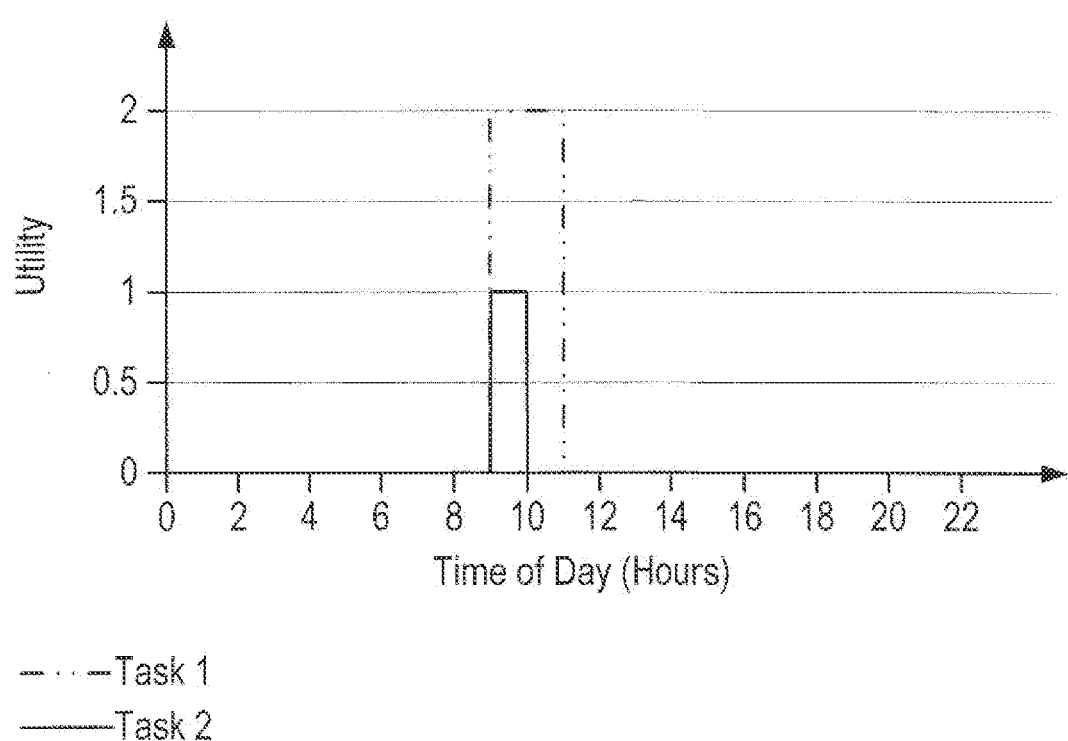
FIG. 5 illustrates a graph describing an example of how utility functions are used by the example reservation system of FIG. 2 to evaluate task schedules.

FIG. 5 illustrates an example using two tasks, task 1 and task 2, each with time-boxed utility functions spanning different time periods, and each requiring a 1-hour execution time. The execution of Task 1 is twice as useful/valuable as that of Task 2, and Task 1 allows greater flexibility—its full value (2.0) is realized if it's executed anywhere between 9:00 am and 11:00 am. Task 2, by contrast, has a value of only 1.0, and must be executed exactly at 9:00 am. The system considers two proposed schedules, Schedule A and Schedule B:

| Schedule A | | |
|---|---|---|
| Task | Proposed Start Time | Utility |
| Task 1 | 9:00 am | 2.0 |
| Task 2 | 10:00 am | 0.0 |
| Total Utility Score | | 2.0 |

| Schedule B | | |
|---|---|---|
| Task | Proposed Start Time | Utility |
| Task 1 | 10:00 am | 2.0 |
| Task 2 | 9:00 am | 1.0 |
| Total Utility Score | | 3.0 |

Because Schedule B offers a greater total utility over the two-hour execution window of the example, it is chosen in preference to Schedule A. Although this has the effect of delaying the more important or valuable task (Task 1) in favor of the less valuable task (Task 2), Schedule B allows both tasks to produce value. The overall higher utility value thus reflects the fact that the selected task schedule best utilizes the available resources to realize the value of each scheduled task. Even in cases where it is not possible to schedule all tasks, the total utility score provides a metric that quantifies which schedule will maximize the overall utility provided by the tasks selected for execution.

Figure 6:
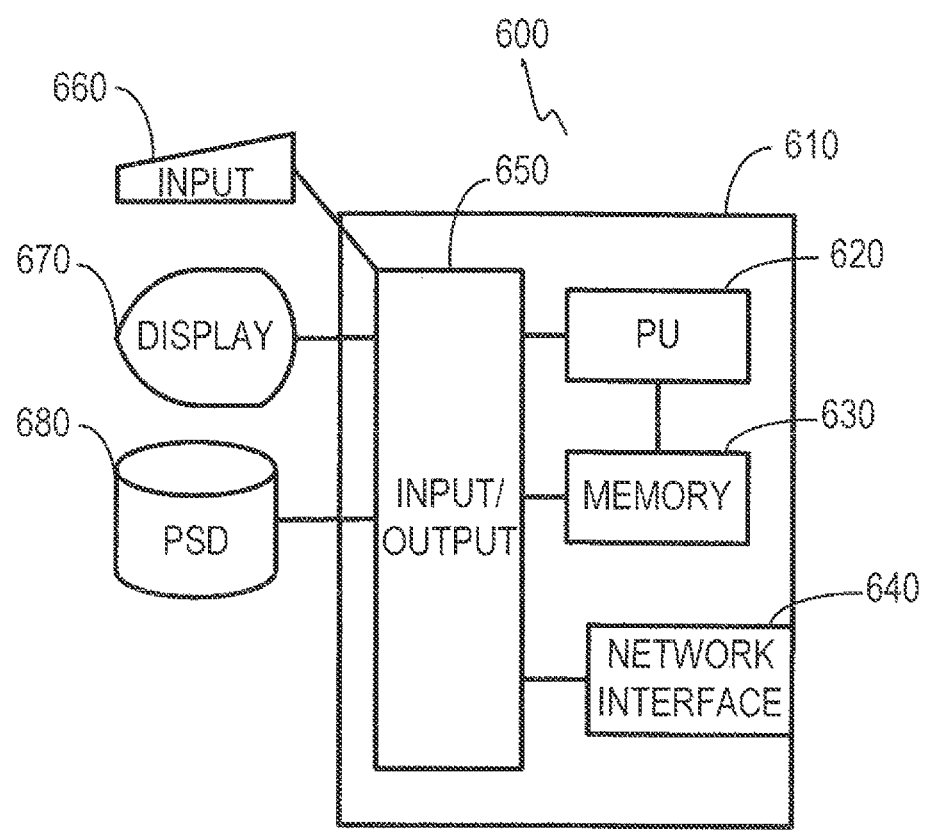
FIG. 6 illustrates an example of a computer system suitable for executing software that performs at least some of the functionality described herein.

Referring now to FIG. 6, an example computer system 600 is shown that may be used as a reservation system, such as virtual machine 130c of FIG. 1, or as any other virtual or real computer system shown in the figures and described herein. Example computer system 600 may include a programmable control device 610 which may be optionally connected to input unit 660 (e.g., a keyboard, mouse, touch screen, etc.), display device 670 or non-volatile/persistent storage device (PSD) 680 (sometimes referred to as direct access storage device DASD). Also, included with programmable control device 610 is a network interface 640 for communication via a network with other computing and corporate infrastructure devices (see, e.g., network 102 of FIG. 1). Note that network interface 640 may be included within programmable control device 610 or be external to programmable control device 610. In either case, programmable control device 610 will be communicatively coupled to network interface 640. Also note that non-volatile storage unit 680 represents any form of non-volatile storage including, but not limited to, all forms of optical, magnetic and solid-state storage elements.

Programmable control device 610 may be included in a computer system and be programmed to perform methods in accordance with this disclosure (e.g., method 300 illustrated in FIG. 3). Programmable control device 610 includes a processing unit (PU) 620, input-output (I/O) interface 650 and memory 630. Processing unit 620 may include any programmable controller device including, for example, processors of an IBM mainframe (such as a quad-core z10 mainframe microprocessor). Alternatively, in non mainframe systems, examples of processing unit 620 include the Intel Core®, Pentium® and Celeron® processor families from Intel and the Cortex® and ARM® processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory 630 may include one or more memory modules and include random access memory (RAM), read only memory (ROM), programmable read only memory (PROM), programmable read-write memory, and solid state memory. One of ordinary skill in the art will also recognize that PU 620 may also include some internal memory including, for example, cache memory.

In addition, acts in accordance with the methods of FIGS. 3 and 6 may be performed by an example computer system 600 including a single computer processor, a special purpose processor (e.g., a digital signal processor, "DSP"), a plurality of processors coupled by a communications link or a custom designed state machine, or other device capable of executing instructions organized into one or more program modules. Custom designed state machines may be embodied in a hardware device such as an integrated circuit including, but not limited to, application specific integrated circuits ("ASICs") or field programmable gate array ("FPGAs").

Storage devices, sometimes called "memory medium," "computer-usable medium" or "computer-readable storage medium," are suitable for tangibly embodying program instructions and may include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as network 102 and/or a wireless link.

As evident from the examples presented, at least some of the functionality described herein (e.g., scheduler module 200 of FIGS. 1 and 2), may be performed on computers implemented as virtualized computer systems (e.g., systems implemented using z/VM virtual machine operating system software by IBM), as well as by distributed computer systems (e.g., diskless workstations and netbooks), just to name two examples. All such implementations and variations of a computer system are contemplated by the present disclosure.

The above discussion is meant to illustrate the principles of at least some example embodiments of the claimed subject matter. Various features are occasionally grouped together in a single embodiment for the purpose of streamlining the disclosure. This method of disclosure is not to be interpreted as reflecting an intention that the embodiments of the claimed subject matter require more features than are expressly recited in each claim.

Various changes in the details of the illustrated operational methods are possible without departing from the scope of the claims that follow. For instance, illustrative flow chart steps or process steps of FIG. 3 may perform the identified steps in an order different from that disclosed here. Alternatively, some embodiments may combine the activities described herein as being separate steps. Similarly, one or more of the described steps may be omitted, depending upon the specific operational environment the method is being implemented in.

Other variations and modifications will become apparent to those of ordinary skill in the art once the above disclosure is fully appreciated. For example, although events and metric data are described as originating, at least in part, from computers such as PCs, mainframes and workstations, other devices or components may also source metric data and/or trigger events. Examples of such devices may include network switches, network routers, disk drives, raid controllers, printers, modems, uninterruptable power supplies and datacenter environmental sensing and control devices. Also, although a mainframe computer system was described in the examples presented, the systems and methods disclosed are not limited to mainframe computer systems. Many other types of computer systems and topologies may be equally suitable for implementing the systems, such as any of a variety of distributed computer systems interconnected by one or more communication networks (e.g., Amazon's EC2 cloud topology). All such computer systems and topologies are contemplated by the present disclosure. It is intended that the following claims be interpreted to include all such variations and modifications.

What is claimed is:

1. A computer system for utility-driven workload scheduling, the system comprising:
a computer device and a programmable control device, the programmable control device configured to:
receive from the computer device a task including a time-dependent task utility function, wherein the time-dependent task utility function includes a task utility value that is constant or increasing until reaching a time deadline;
determine a time window for the received task to be scheduled for execution on the computer system based on the time-dependent task utility function of the received task;
identify a plurality of other tasks previously scheduled to be executed on the computer system within the time window of the received task, the computer system providing computer resources that are shared among the received task and the plurality of other tasks;
identify a plurality of candidate schedules, the plurality of candidate schedules including a first candidate schedule and a second candidate schedule, the first and second candidate schedules being different scheduling combinations of the received task and the plurality of other tasks;
calculate a task utility value for each task included within the first and second candidate schedules based upon the time-dependent task utility function for each respective task;
calculate a first overall utility value for the first candidate schedule based on the calculated task utility values for the tasks within the first candidate schedule and a second overall utility value for the second candidate schedule based on the calculated task utility values for the tasks within the second candidate schedule;
select a schedule among the plurality of candidate schedules based on the first and second overall utility values; and
queue the received task for execution according to the selected schedule.

2. The computer system of claim 1, wherein the task utility value of the received task decreases after the time deadline.

3. The computer system of claim 1, wherein the programmable control device is configured to identify the plurality of candidate schedules by randomly selecting the first and second candidate schedules from a larger set of candidate schedules.

4. The computer system of claim 1, wherein the programmable control device is configured to calculate the first overall utility value for the first candidate schedule by aggregating the task utility values for the tasks included within the first candidate schedule.

5. The computer system of claim 1, wherein the programmable control device is configured to calculate the second overall utility value for the second candidate schedule by determining time-dependent task utility values for the tasks included within the second candidate schedule.

6. The computer system of claim 1, wherein the programmable control device is configured to select the first candidate schedule if the first overall utility value is higher than the second overall utility value, and select the second candidate schedule if the second overall utility value is higher than the first overall utility value.

7. A method for utility-driven workload scheduling, the method comprising:
  receiving from a computing device having at least one processor, a task to be scheduled for execution within a computer system, the received task including a time-dependent task utility function;
  determining a time window for the received task to be scheduled for execution on the computer system based on the time-dependent task utility function of the received task;
  identifying a plurality of other tasks previously scheduled to be executed on the computer system within the time window of the received task, the computer system providing computer resources that are shared among the received task and the plurality of other tasks;
  identifying a plurality of candidate schedules, the plurality of candidate schedules including a first candidate schedule and a second candidate schedule, the first and second candidate schedules being different scheduling combinations of the received task and the plurality of other tasks;
  calculating a task utility value for each task included within the first and second candidate schedules based upon a corresponding time-dependent task utility function;
  calculating a first overall utility value for the first candidate schedule based on the calculated task utility values for the tasks within the first candidate schedule and a second overall utility value for the second candidate schedule based on the calculated task utility values for the tasks within the second candidate schedule;
  selecting a schedule among the plurality of candidate schedules based on the first and second overall utility values; and
  queuing the received task for execution according to the selected schedule.

8. The method of claim 7, wherein the time-dependent task utility function includes a constant or increasing task utility value until reaching a time deadline.

9. The method of claim 7, wherein the second overall utility value for the second candidate schedule is calculated by determining task utility values for the tasks included within the second candidate schedule.

10. A computer program product tangibly embodied on a non-transitory computer-readable medium and including executable code that, when executed, is configured to cause at least one processor to:
  receive a task to be scheduled for execution within a computer system, the received task defining a time-dependent task utility function, the time-dependent task utility function providing a task utility value that changes over time such that the task utility value at a given point in time represents a level of usefulness of executing the received task at the given point in time;
  identify a plurality of other tasks scheduled to be executed on the computer system within a time window associated with the received task, the computer system providing computer resources that are shared among the received task and the plurality of other tasks;
  evaluate a plurality of candidate schedules based on the time-dependent task utility function associated with the received task, each of the plurality of candidate schedules being different scheduling combinations of the received task and the plurality of other tasks; and
  provide at least one of the plurality of candidate schedules for display based on an outcome of the evaluation.

11. The computer program product of claim 10, wherein each of the plurality of other tasks are associated with a time-dependent task utility function, and the executable code to evaluate the plurality of candidate schedules includes instructions to calculate an overall utility value for each candidate schedule based on the time-dependent task utility function associated with the received task and the time-dependent task utility function associated with each of the plurality of other tasks.

12. The computer program product of claim 11, wherein the overall utility of each candidate schedule comprises a summation of each of the task utilities corresponding to each candidate schedule at a point in time.

13. The computer program product of claim 11, wherein the overall utility of each candidate schedule comprises an integral of each of the task utilities corresponding to each candidate schedule over a span of time.

14. The computer program product of claim 11, wherein the displayed candidate schedule is selected from the plurality of candidate schedules by comparing each of the overall utilities of the candidate schedules against each other.

15. The computer program product of claim 11, wherein the displayed candidate schedule is selected from the plurality of candidate schedules by analyzing the overall utilities of the candidate schedules as a group.

16. The computer program product of claim 10, wherein the executable code that, when executed, is configured to cause the at least one processor to:
  provide a plurality of time-dependent task utility functions for selection, each of the plurality of time-dependent task utility functions being different; and
  receive selection information identifying one of the plurality of time-dependent task utility functions as the time-dependent task utility function associated with the received task.

17. The computer program product of claim 10, wherein the executable code that, when executed, is configured to cause the at least one processor to:
  receive selection information that indicates that the displayed candidate schedule has been rejected;
  receive updated function information that indicates a selection of a different type of time-dependent task utility function for the received task.

18. The computer program product of claim 10, wherein the plurality of candidate schedules comprises candidate schedules randomly selected from a larger number of schedules.

19. The computer program product of claim 10, wherein the executable code that, when executed, is configured to cause the at least one processor to:
  receive acceptance information indicating that the displayed candidate schedule has been accepted; and
  schedule the received task according to the accepted candidate schedule.

20. A method for utility-optimized scheduling of computer system tasks, the method executed within a first computer system having at least one processor, the method comprising:
  determining a time window comprising a candidate schedule for a new task to be executed on a second computer system having at least one processor;
  identifying a plurality of other tasks scheduled to be executed on the second computer system within the time window, the second computer system providing computer resources that are shared among the new task and the plurality of other tasks;

identifying a plurality of candidate schedules having associated time-dependent task utility functions that include specification of the execution times for at least one of a plurality of tasks, the plurality of tasks including the new task and the plurality of other tasks;

calculating an overall utility for each candidate schedule based upon the associated time-dependent task utility calculated for each of the plurality of tasks when scheduled according to each corresponding candidate schedule; and queuing for execution, by the processor, the candidate schedule having highest overall utility.

21. The method of claim 20, wherein the first and second computer systems comprise different computer systems.

22. The method of claim 20, further comprising calculating each task utility using a time-variant utility function associated with each corresponding task of the plurality of tasks.

23. The method of claim 20, further comprising analyzing the overall utility of each of the plurality of candidate schedules comprises using a method selected from the group consisting of a deterministic method, a stochastic method and a metaheuristic method.

24. The method of claim 20, wherein the plurality of candidate schedules comprises candidate schedules randomly selected from the plurality of schedules.

25. The method of claim 20, wherein the overall utility of each candidate schedule comprises a summation of each of the task utilities corresponding to each candidate schedule at a point in time.

26. The method of claim 20, wherein the overall utility of each candidate schedule comprises an integral of each of the task utilities corresponding to each candidate schedule over a span of time.

27. The method of claim 20, wherein the preferred schedule is identified by comparing each of the overall utilities of the candidate schedules against each other.

28. The method of claim 20, wherein the preferred schedule is identified by analyzing the overall utilities of the candidate schedules as a group.

* * * * *